Figure 1:
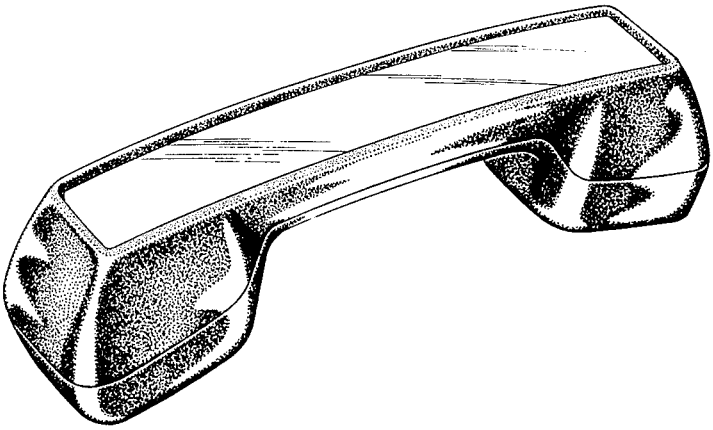
Figure 2:
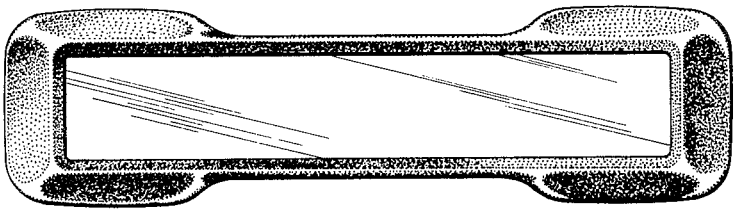
Figure 3:
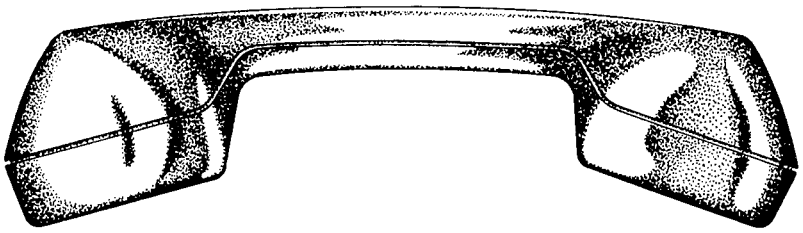
Figure 4:
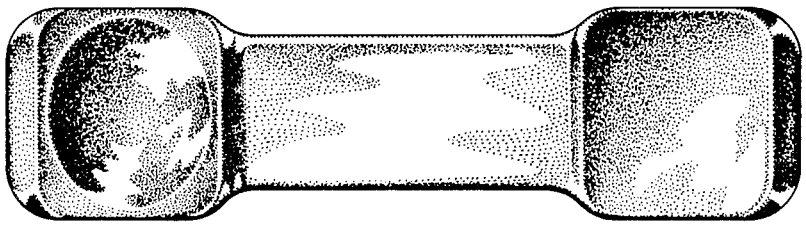
Figure 5:
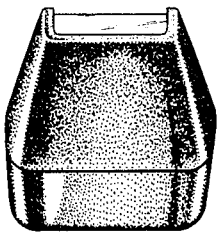
Figure 6:
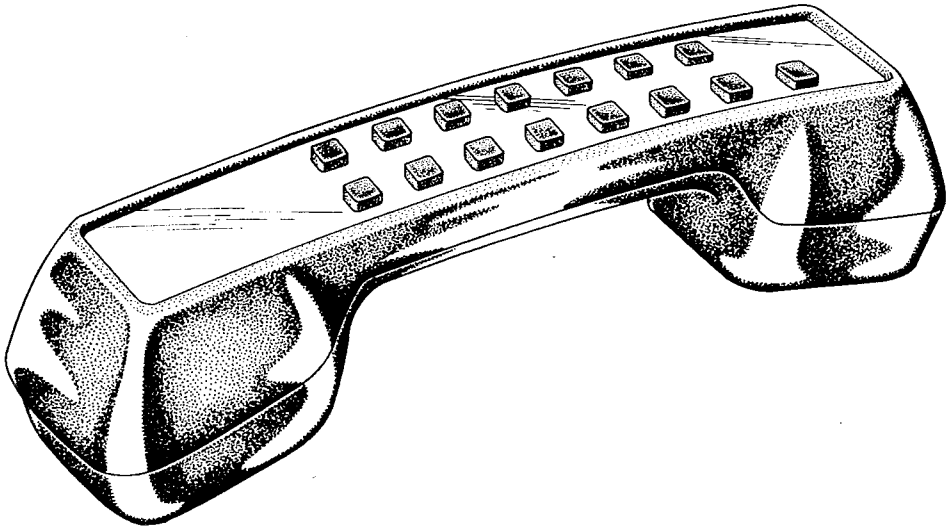

United States Defensive Publication [19] (H) [11] T963,001

Everhart et al. [43] Oct. 4, 1977

[54] TELEPHONE HANDSET

[75] Inventors: Joseph Robert Everhart, Holmdel; Donald Michael Genaro, Haworth; Rembert Ryan Stokes, Middletown, all of N.J.; Gordon Elliot Sylvester, Jamaica, N.Y.; Alvin Richard Tilley, Red Bank, N.J.

[73] Assignee: Bell Telephone Laboratories, Incorporated, Murray Hill, N.J.

[21] Appl. No.: 718,853

[22] Filed: Aug. 30, 1976

[51] Int. Cl. ..... D14 03

[52] U.S. Cl. ..... 14/63

[57] ABSTRACT

The design relates to a telephone handset substantially as shown.

3 Claims, 3 Sheets Drawing,

1 Pages Specification

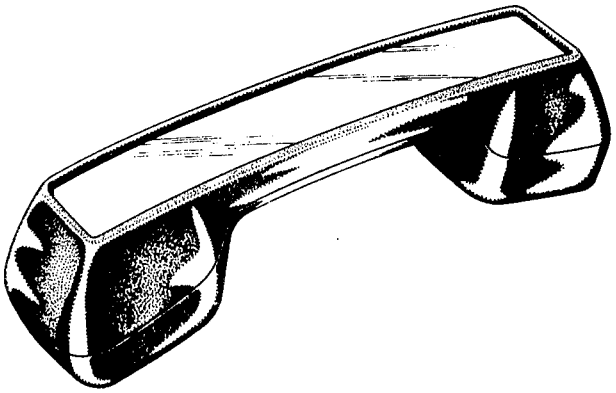

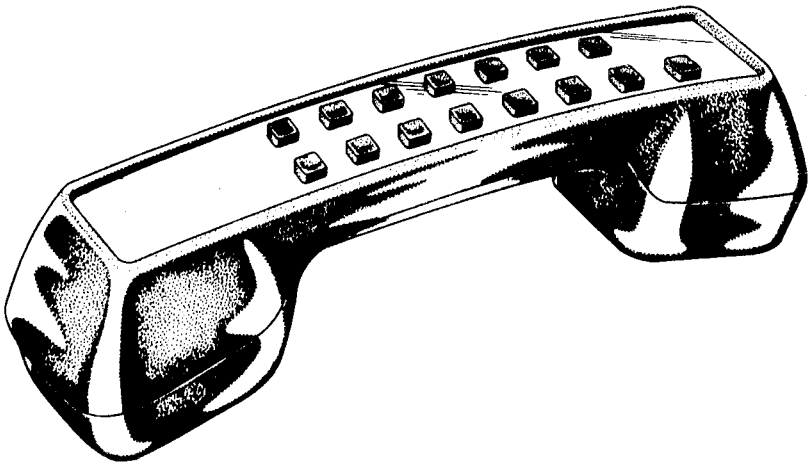

The file of this unexamined application may be inspected and copies thereof may be purchased (849 O.G. 1221, Apr. 9, 1968).